(12) United States Patent
Machida et al.

(10) Patent No.: US 10,222,095 B2
(45) Date of Patent: Mar. 5, 2019

(54) HEAT STORAGE APPARATUS AND METHOD OF COMPLETING CRYSTALLIZATION OF HEAT STORAGE MATERIAL

(71) Applicant: Panasonic Corporation, Osaka (JP)

(72) Inventors: Hironobu Machida, Nara (JP); Motohiro Suzuki, Osaka (JP); Shinsuke Takeguchi, Osaka (JP); Kentaro Shii, Osaka (JP); Masaaki Nagai, Osaka (JP)

(73) Assignee: Panasonic Corporation, Osaka (JP)

( * ) Notice: Subject to any disclaimer, the term of this patent is extended or adjusted under 35 U.S.C. 154(b) by 64 days.

(21) Appl. No.: 15/448,678

(22) Filed: Mar. 3, 2017

(65) Prior Publication Data

US 2017/0268802 A1    Sep. 21, 2017

(30) Foreign Application Priority Data

Mar. 18, 2016    (JP) .................................. 2016-055195

(51) Int. Cl.
  *F24V 30/00* (2018.01)
  *F28D 20/00* (2006.01)
  *F28D 20/02* (2006.01)

(52) U.S. Cl.
  CPC ............ *F24V 30/00* (2018.05); *F28D 20/003* (2013.01); *F28D 20/028* (2013.01); *Y02E 60/145* (2013.01)

(58) Field of Classification Search
  CPC ...... F24V 30/00; F28D 20/003; F28D 20/028; F28D 20/00; F28D 2020/0017; F28D 2020/0021; F28D 2020/0069; F28D 2020/0073; F28D 15/02; F28D 15/0266; F28D 15/025; F28D 15/0208; Y02E 60/145; Y02E 60/14
  USPC ........... 165/10, 6, 236, 902, 104.15, 104.17, 165/104.18, 104.22, 104.25, 104.31
  See application file for complete search history.

(56) References Cited

U.S. PATENT DOCUMENTS 3,225,820 A * 12/1965 Riordan ................ F25D 19/006
                                                            165/96
2014/0014290 A1 * 1/2014 Howes ................ F28D 20/0056
                                                            165/10

(Continued)

FOREIGN PATENT DOCUMENTS

JP        3076847 B1     8/2000
JP    2001183085 A *    7/2001    ........... F28D 20/021

(Continued)

OTHER PUBLICATIONS

The Extended European Search Report dated Aug. 9, 2017 for the related European Patent Application No. 17159028.4.

*Primary Examiner* — Justin M Jonaitis
(74) *Attorney, Agent, or Firm* — McDermott Will & Emery LLP

(57) ABSTRACT

A heat storage apparatus according to the present disclosure includes a casing, a heat storage material, and movable components. An internal space in the casing is partitioned into a plurality of spaces. The heat storage material is located in each of the plurality of spaces. At least one movable component is disposed in contact with the heat storage material in each of the plurality of spaces, and is capable of changing a position thereof relative to a position of the casing as time proceeds.

18 Claims, 6 Drawing Sheets

(56) References Cited

U.S. PATENT DOCUMENTS

| | | | | |
|---|---|---|---|---|
| 2015/0114591 A1* | 4/2015 | Howes | ................ | F28D 20/0056 |
| | | | | 165/10 |
| 2017/0219294 A1* | 8/2017 | Longis | .................. | F24H 7/0216 |

FOREIGN PATENT DOCUMENTS

| JP | 2010-133688 | 6/2010 |
|---|---|---|
| JP | 2015-187535 | 10/2015 |

* cited by examiner

HEAT STORAGE APPARATUS AND METHOD OF COMPLETING CRYSTALLIZATION OF HEAT STORAGE MATERIAL

BACKGROUND

1. Technical Field

The present disclosure relates to a heat storage apparatus and a method of completing crystallization of a heat storage material.

2. Description of the Related Art

A heat storage material is a material that can store hot heat or cold heat. The hot heat or the cold heat stored in the heat storage material is dissipated as demanded. A heat storage material that is capable of storing hot heat or cold heat primarily by making use of exothermic reaction or endothermic reaction occurring due to a phase change of a substance is called a latent heat storage material. In this specification, a latent heat storage material that is capable of storing cold heat and dissipating the cold heat as demanded may be called a latent heat cold storage material or simply a cold storage material.

Among latent heat cold storage materials, a latent heat cold storage material having a high thermal storage density that allows a hydrate called a clathrate hydrate to be formed by cooling, such as a tetrabutylammonium bromide (TBAB) aqueous solution and a tetrahydrofuran (THF) aqueous solution, is available. Even if such a latent heat cold storage material is cooled to a hydrate generation temperature or less, the latent heat cold storage material tends to be in a supercooled state. Therefore, it is difficult to stably use such a latent heat cold storage material as a cold storage material. Consequently, a technology of cancelling the supercooling of such a latent heat cold storage material is proposed.

For example, Japanese Unexamined Patent Application Publication No. 2015-187535 (Patent Literature (PTL) 1) describes a supercooling preventing apparatus that uses a tetrabutylammonium bromide (TBAB) aqueous solution as a cold storage material. The supercooling preventing apparatus includes a first cold-storage-material storing unit, a voltage applier, a second cold-storage-material storing unit, and a cooler. The first cold-storage-material storing unit stores a cold storage material. The second cold-storage-material storing unit is connected to the first cold-storage-material storing unit, and stores cold storage material. The cooler cools the cold storage material in the second cold-storage-material storing unit to a hydrate generation temperature or less. The voltage applier applies a voltage to the cold storage material in a state in which the temperature of the cold storage material in the first cold-storage-material storing unit is less than the hydrate generation temperature.

Japanese Unexamined Patent Application Publication No. 2010-133688 (Patent Literature (PTL) 2) describes a supercooling releasing method of releasing a supercooled state of a heat storage material. In this method, a contact portion where at least a portion of a first member and at least a portion of a second member whose coefficient of thermal expansion differs from that of the first member normally contact each other without being joined to each other is provided in the heat storage material. In this method, relative sliding between the first member and the second member at the contact portion, caused by a difference between the coefficient of thermal expansion of the first member and the coefficient of thermal expansion of the second member, is considered an opportunity to release the supercooled state of the heat storage material. For example, according to this method, it is confirmed that the supercooled state is canceled within one hour when a TBAB aqueous solution is used as a heat storage material.

SUMMARY

According to the technologies described in PTL 1 and PTL 2, it takes a long time to crystallize the entire heat storage material. One non-limiting and exemplary embodiment provides an apparatus and a method of completing crystallization of a heat storage material in a short time.

In one general aspect, the techniques disclosed here feature a heat storage apparatus, including a casing having an internal space partitioned into a plurality of spaces; a heat storage material that is located in each of the plurality of spaces; and at least one movable component that is disposed in contact with the heat storage material in each of the plurality of spaces, and that is capable of changing a position thereof relative to a position of the casing as time proceeds.

According to the above-described apparatus, it is possible to complete the crystallization of the heat storage material in a short time.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1A:
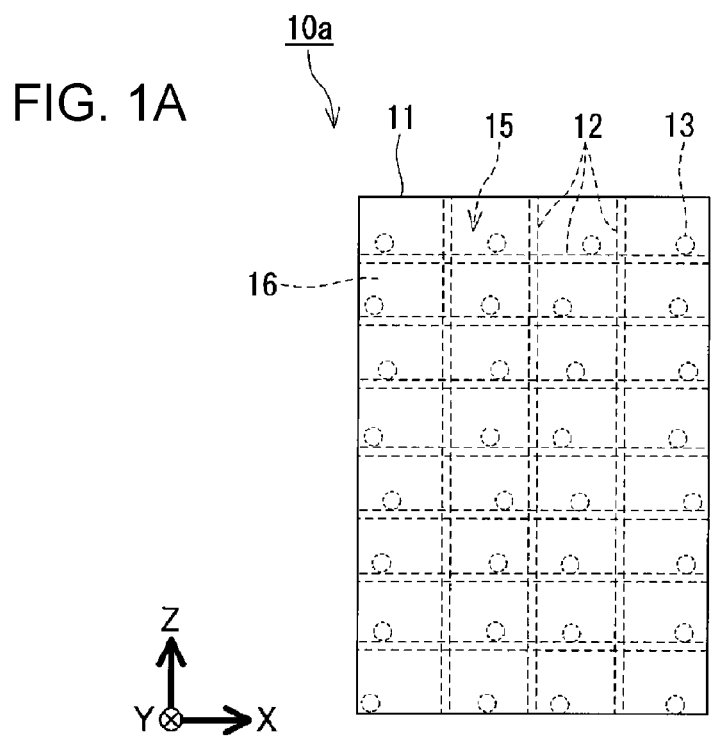
FIG. 1A is a front view of an exemplary heat storage apparatus according to the present disclosure.
Figure 1B:
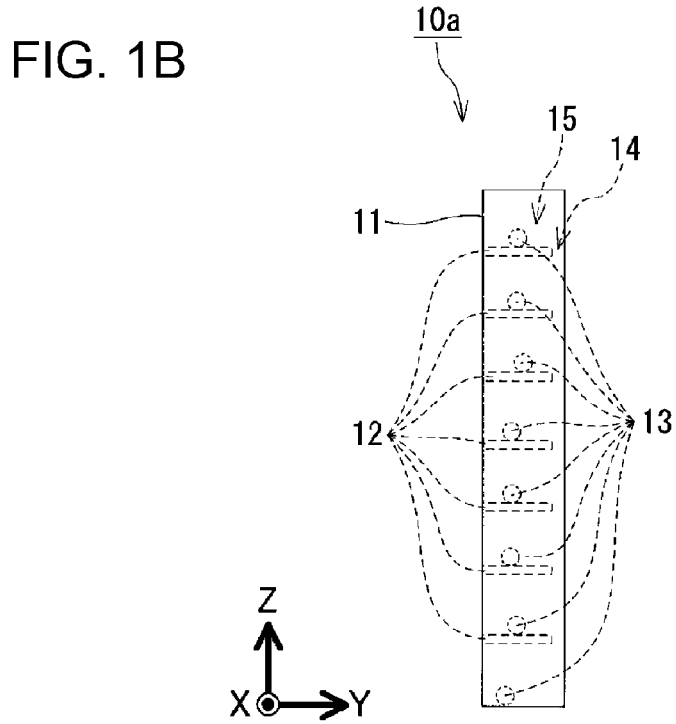
FIG. 1B is a side view of the heat storage apparatus in FIG. 1A.

Underlying Knowledge Based on Studies by Inventors

If crystallization of heat storage materials can be completed in a short time (such as within one minute), the range of use of heat storage materials is further increased. For example, in an automobile having a function of automatically turning off an engine thereof when the automobile is stopped, the use of a heat storage material for cooling the interior of the automobile when the engine is turned off while the automobile is stopped can be considered. In this case, when the engine is turned off while the automobile is stopped, cold heat stored in the heat storage material is used instead of cold heat that is obtained by driving a compressor by the engine. That is, the following method can be considered. The method includes repeating a cycle in which, while the cold heat is stored by crystallizing the heat storage material by using the compressor when the automobile is travelling, a cold heat storage material is melted and the cold heat is dissipated when the engine is turned off while the automobile is stopped. When considering traffic situations of automobiles in urban areas, the distance between traffic lights may be small and, thus, the travel time of automobiles may be short. Therefore, it is desirable that the crystallization of heat storage materials be completed in a short time, and that the cold heat be stored as latent heat in a short time in the entire heat storage material. However, in the technologies in PTL 1 and PTL 2, it takes a long time for the entire heat storage material to be crystallized, as a result of which, for example, if the travel time of automobiles between traffic lights is short, it is difficult for the crystallization of the entire heat storage material to be completed. From such viewpoints, as a result of repeating studies on the method of completing the crystallization of heat storage materials in a shorter time, the inventors conceived that if an internal space in a casing containing the heat storage material can be partitioned into a plurality of spaces and multiple crystal nuclei can be generated at the same time in each of the plurality of spaces, the crystallization of the entire heat storage material can be completed in a short time. This is the underlying knowledge forming the basis of the present disclosure.

The aforementioned underlying knowledge is based on the studies conducted by the inventors, and is not prior art.

According to a first aspect of the present disclosure, there is provided a heat storage apparatus, including:

a casing having an internal space partitioned into a plurality of spaces;

a heat storage material that is located in each of the plurality of spaces; and at least one movable component that is disposed in contact with the heat storage material in each of the plurality of spaces, and that is capable of changing a position thereof relative to a position of the casing as time proceeds.

According to the first aspect, the internal space in the casing is partitioned into a plurality of spaces, and a portion of a heat storage material and at least one movable component exist in each of the plurality of spaces. Since each movable component is capable of changing its position relative to the casing as time proceeds, each movable component fulfills the role of providing the opportunity of releasing a supercooled state of the heat storage material. Therefore, according to the first aspect, it is possible to generate multiple crystal nuclei at the same time in each of the plurality of spaces and to cancel the supercooled state of the heat storage material. In addition, since each movable component can change its position relative to the casing as time proceeds, it is possible to continue movement of each movable component in the corresponding space. Therefore, in the plurality of spaces, the heat storage material circulates by convection, and the generated crystal nuclei move in the heat storage material. As a result, the crystal nuclei can be diffused in a short time into the entire heat storage material contained in each of the plurality of spaces. Accordingly, according to the first aspect, since, in (each of) the plurality of spaces, multiple crystal nuclei can be generated at the same time and further diffused, it is possible to complete the crystallization of the entire heat storage material contained in the casing of the heat storage apparatus in a short time.

The first aspect excels in the following points when compared to the technologies in PTL 1 and PTL 2. In the technology in PTL 1, a voltage is applied to the cold storage material by a voltage applier in a state in which the temperature of the cold storage material in the first cold-storage-material storing unit is less than a hydrate generation temperature, and crystal nuclei are generated in the first cold-storage-material storing unit. The crystal nuclei are supplied to the second cold-storage-material storing unit that is connected to the first cold-storage-material storing unit. Therefore, the supercooling preventing apparatus according to PTL 1 has a large and complicated structure and takes a long time to crystallize the entire cold storage material. In addition, in the technology in PTL 1, focusing on the point that the higher the supercooling degree of the cold storage material, the greater the tendency with which crystal nuclei are generated, a voltage is applied in a state in which the temperature of the cold storage material in the first cold-storage-material storing unit is less than the hydrate generation temperature. However, when the supercooling degree of the cold storage material is too high, a large amount of energy is consumed. Here, the supercooling degree of the cold storage material may be thought of as referring to the difference obtained by subtracting the temperature of the cold storage material in a supercooled state from the melting point of the cold storage material.

In the technology in PTL 2, although it is confirmed that supercooling is cancelled within one hour when a TBAB aqueous solution is used as a heat storage material, it takes an even longer time for the entire heat storage material to crystallize.

Accordingly, in the technologies in PTL 1 and PTL 2, it takes a long time for the entire heat storage material to be crystallized, as a result of which, for example, if the travel time of automobiles between traffic lights is short, it is difficult for the crystallization of the entire heat storage material to be completed. In contrast, according to the first aspect, since, in each of the plurality of spaces, multiple crystal nuclei are generated and diffused, it is possible to complete the crystallization of the entire heat storage material contained in the casing of the heat storage apparatus in a short time. Therefore, according to the first aspect, even if the travel time of an automobile between traffic lights is short, it is possible to complete the crystallization of the heat storage material in a short time.

According to a second aspect of the present disclosure based on the first aspect, in the heat storage apparatus, the casing includes a pair of inner peripheral surfaces that are disposed side by side in a specified direction and face opposite directions, and D/L is 1.02 to 2.70, where D is a distance between the pair of inner peripheral surfaces, and L is a dimension of the at least one movable component in the specified direction. According to the second aspect, the distance from the position where the aforementioned movement occurs to each of the inner peripheral surfaces of the casing in the specified direction is small, so that heat that is generated by cancelling the supercooling of the heat storage material as a result of performing the aforementioned movement is quickly dissipated to the outside of the casing. Therefore, it is possible to more reliably complete the crystallization of the heat storage material in a short time.

According to a third aspect of the present disclosure based on the first aspect or the second aspect, the heat storage apparatus further includes a partitioning member which serves as a structural member, which has a structure that allows passage of the heat storage material in a liquid phase, and which partitions the internal space in the casing into the plurality of spaces. According to the third aspect, since the heat storage material in the liquid phase is capable of passing through the partitioning member, the heat storage material tends to pass through the partitioning member and circulate by convection. Therefore, the generated crystal nuclei tend to move in the heat storage material, so that it is possible to more reliably complete the crystallization of the heat storage material in a short time.

According to a fourth aspect of the present disclosure based on the third aspect, in the heat storage apparatus, the partitioning member serves as the at least one movable component. According to the fourth aspect, the volume of the heat storage material that can be stored in the casing is large in addition to the internal space in the casing being partitionable into the plurality of spaces.

According to a fifth aspect of the present disclosure based on any one of the first to fourth aspect, in the heat storage apparatus, each of the plurality of spaces has a volume of 100 $cm^3$ or less. According to the fifth aspect, since the plurality of spaces each have a volume of 100 $cm^3$ or less, the heat storage material tends to circulate by convection in each entire space due to the aforementioned movement. As a result, the crystal nuclei can be more reliably diffused in a short time into the entire heat storage material contained in each of the plurality of spaces.

According to a sixth aspect of the present disclosure, there is provided a method of completing crystallization of a heat storage material of a heat storage apparatus, the heat storage apparatus including:

a casing having an internal space partitioned into a plurality of spaces, the casing including an inner peripheral surface;

the heat storage material that is located in each of the plurality of spaces; and at least one movable component that is disposed in contact with the heat storage material in each of the plurality of spaces, and that is capable of changing a position thereof relative to a position of the casing as time proceeds, the method including:

continuing at least one of movements of (i) repeated contact and separation between the movable components or sliding between the movable components, (ii) repeated contact and separation between the inner peripheral surface of the casing and the at least one movable component, or sliding between the inner peripheral surface of the casing and the at least one movable component, and (iii) repeated contact and separation between a surface of a structural member in the casing and the at least one movable component, or sliding between the surface of the structural member in the casing and the at least one movable component, to cancel supercooling of the heat storage material and complete the crystallization of the heat storage material in a predetermined time.

According to the sixth aspect, the internal space in the casing is partitioned into the plurality of spaces, and portions of the heat storage material and the movable components exist in a corresponding one of the plurality of spaces. Since each movable component is capable of changing its position relative to the casing as time proceeds, each movable component fulfills the role of providing the opportunity of releasing a supercooled state of the heat storage material. Therefore, according to the sixth aspect, it is possible to generate multiple crystal nuclei at the same time in each of the plurality of spaces and to cancel the supercooled state of the heat storage material. In addition, according to the sixth aspect, it is possible to continue the movement or movements of each movable component in the corresponding space. Consequently, in the plurality of spaces, the heat storage material circulates by convection, and the generated crystal nuclei move in the heat storage material. As a result, the crystal nuclei can be diffused in a short time into the entire heat storage material contained in each of the plurality of spaces. Accordingly, according to the sixth aspect, since, in (each of) the plurality of spaces, multiple crystal nuclei can be generated at the same time and further diffused, it is possible to complete the crystallization of the entire heat storage material contained in the casing of the heat storage apparatus in a short time.

According to a seventh aspect of the present disclosure based on the sixth aspect, in the method, the casing includes a pair of the inner peripheral surfaces that are disposed side by side in a specified direction and face opposite directions, and D/L is 1.02 to 2.70, where D is a distance between the pair of inner peripheral surfaces, and L is a dimension of the at least one movable component in the specified direction. According to the seventh aspect, the distance from the position where the aforementioned movement or movements occur to the inner peripheral surfaces of the casing in the specified direction is small. Therefore, heat that is generated by cancelling supercooling of the heat storage material as a result of performing the aforementioned movement or movements is quickly dissipated to the outside of the casing. Consequently, it is possible to more reliably complete the crystallization of the heat storage material in a short time.

According to an eighth aspect of the present disclosure based on the sixth aspect or the seventh aspect, in the method, the at least one of the movements is caused to occur by changing the position of the casing and the position of the at least one movable component relative to each other as time proceeds as a result of applying vibration energy to the casing or the at least one movable component. According to the eighth aspect, it is possible to complete the crystallization of the heat storage material in a short time by applying vibration energy to the casing or each movable component.

According to a ninth aspect of the present disclosure based on the sixth aspect or the seventh aspect, in the method, the at least one movable component includes a magnetic body, and the at least one of the movements is caused to occur by changing the position of the casing and the position of the at least one movable component relative to each other as time proceeds as a result of generating a magnetic field around the at least one movable component. According to the ninth aspect, the aforementioned movement or movements are caused to occur by generating a magnetic field around each movable component including a magnetic body. Therefore, it is possible to complete the crystallization of the heat storage material in a short time.

According to a tenth aspect of the present disclosure based on the sixth aspect or the seventh aspect, in the method, the at least one of the movements is caused to occur by changing the position of the casing and the position of the at least one movable component relative to each other as time proceeds as a result of applying an external force to and deforming the casing. According to the tenth aspect, it is possible to complete the crystallization of the heat storage material in a short time due to the occurrence of the aforementioned movement or movements resulting from applying an external force to and deforming the casing.

According to an eleventh aspect of the present disclosure based on the sixth aspect or the seventh aspect, in the method, the at least one of the movements is caused to occur by changing the position of the casing and the position of the at least one movable component relative to each other as time proceeds as a result of applying an external force to the casing and directly or indirectly displacing the at least one movable component. According to the eleventh aspect, the aforementioned movement or movements are caused to occur by directly or indirectly displacing each movable component as a result of applying an external force to the casing. This makes it possible to complete the crystallization of the heat storage material in a short time.

According to a twelfth aspect of the present disclosure based on any one of the sixth to eleventh aspects, in the method, each of the plurality of spaces has a volume of 100 cm³ or less. According to the twelfth aspect, since the plurality of spaces each have a volume of 100 cm³ or less, the heat storage material tends to circulate by convection in each entire space due to the aforementioned movement or movements. As a result, the crystal nuclei can be more reliably diffused in a short time into the entire heat storage material contained in each of the plurality of spaces.

According to a different first aspect of the present disclosure, there is provided a heat storage apparatus, including:
a casing having an internal space partitioned into a plurality of spaces;
a heat storage material that is located in each of the plurality of spaces; and
a movable component that is disposed in contact with the heat storage material in each of the plurality of spaces, and that is capable of changing a position thereof relative to the casing as time proceeds.

According to the different first aspect of the present disclosure, the internal space in the casing is partitioned into a plurality of spaces, and a portion of the heat storage material and at least one movable component exist in each of the plurality of spaces. Since each movable component is capable of changing its position relative to the casing as time proceeds, each movable component fulfills the role of providing the opportunity of releasing a supercooled state of the heat storage material. Therefore, according to the different first aspect, it is possible to generate multiple crystal nuclei at the same time in each of the plurality of spaces and to cancel the supercooled state of the heat storage material. In addition, since each movable component can change its position relative to the casing as time proceeds, it is possible to continue the movement or movements of each movable component in the corresponding space. Therefore, in the plurality of spaces, the heat storage material circulates by convection, and the generated crystal nuclei move in the heat storage material. As a result, the crystal nuclei can be diffused in a short time into the entire heat storage material contained in each of the plurality of spaces. Accordingly, according to the different first aspect, since, in each of the plurality of spaces, multiple crystal nuclei can be generated at the same time and further diffused, it is possible to complete the crystallization of the entire heat storage material contained in the casing of the heat storage apparatus in a short time.

According to a different second aspect of the present disclosure based on the different first aspect, the internal space in the casing is partitioned by a partitioning member having a structure that allows passage of the heat storage material in a liquid phase.

According to a different third aspect of the present disclosure based on the different first aspect or the different second aspect, the number of the plurality of spaces may be 50 or more.

According to a different fourth aspect of the present disclosure based on any one of the different first aspect to the different third aspect, the plurality of spaces may each have a volume of 1 cm³ or less.

According to a different fifth aspect of the present disclosure, there may be provided an apparatus, including:
an automobile; and
the heat storage apparatus according to any one of the different first aspect to the different fourth aspect.

Exemplary embodiments of the present disclosure are hereunder described with reference to the drawings. In the description below, a method and a heat storage apparatus according to the present disclosure are exemplified. However, the present disclosure is not limited thereto. In the attached figures, directions X are the same directions, directions Y are the same directions, and directions Z are the same directions.

A method of completing crystallization of a heat storage material according to the present disclosure is realized by using a heat storage apparatus 10a, a heat storage apparatus 10b, a heat storage apparatus 10c, or a heat storage apparatus 10d. In the attached figures, the same or corresponding structural features of the heat storage apparatus 10a, the heat storage apparatus 10b, the heat storage apparatus 10c, and the heat storage apparatus 10d are given the same reference numerals.

As illustrated in FIGS. 1A, 2A, 3A, and 4A, the heat storage apparatus 10a, the heat storage apparatus 10b, the heat storage apparatus 10c, and the heat storage apparatus 10d each include a casing 11 and movable components 13. The casing 11 contains a heat storage material 16. Each movable component 13 is accommodated in the casing 11. When the position of each movable component 13 relative to the position of the casing 11 is changed as time proceeds, for example, in each space of 100 cm³ occupied by the heat storage material 16 contained in the casing 11, the movable components 13 are disposed at locations where at least one of the following movements can occur. The at least one of the movements is (i) repeated contact and separation between the movable components 13 or sliding between the movable components 13, (ii) repeated contact and separation between inner peripheral surfaces of the casing 11 and each movable component 13, or sliding between the inner peripheral surfaces of the casing 11 and each movable component 13, and (iii) repeated contact and separation between a surface of a structural member 12 in the casing 1 and each movable component 13, or sliding between the surface of the structural member 12 in the casing 11 and each movable component 13. Each of the heat storage apparatuses 10a to 10d completes the crystallization of the heat storage material 16 in a predetermined time by cancelling supercooling of the heat storage material 16 as a result of performing the aforementioned movement or movements. The predetermined time is not particularly limited to a certain time, and is, for example, one minute. An automobile may stop at about one minute after the automobile has started moving due to a traffic light in an urban area. Therefore, when any one of the heat storage apparatuses 10a to 10d is installed in the automobile and used for cooling the interior of the automobile when an engine is turned off while the automobile is stopped, it is desirable that the predetermined time in which the crystallization of the heat storage material 16 can be completed in any one of the heat storage apparatuses 10a to 10d be one minute.

By changing the position of the casing 11 and the position of each movable component 13 relative to each other as time proceeds, the aforementioned movement or movements are continued in all of the spaces of 100 cm$^3$ occupied by the heat storage material 16 contained in the casing 11. By cancelling the supercooling of the heat storage material 16 as a result of performing the aforementioned movement or movements, the crystallization of the heat storage material 16 is completed in the predetermined time. That is, the aforementioned movement or movements are started when the heat storage material 16 that is contained in the casing 11 is in a supercooled state. This makes it possible to complete the crystallization of the heat storage material 16 contained in the casing 11 in a short time.

For example, the aforementioned movement or movements are continued for a time that is greater than or equal to 20% of the predetermined time in which the crystallization of the heat storage material 16 can be completed.

The way in which the heat storage material 16 is contained in the casing 11 is not particularly limited to a certain way. However, typically, the heat storage material 16 is contained in the casing 11 by sealing in the heat storage material 16 in the casing 11 made of a resin material or a metal having good corrosion resistance. Although the shape of the casing 11 is not particularly limited to a certain shape, the casing 11 has, for example, a rectangular parallelepiped shape or a cylindrical shape. It is desirable that the casing 11 have a plate shape. Depending on the situation, the casing 11 may be made of a flexible material. In this case, the shape of the casing 11 can change as time proceeds. The larger the ratio of the surface area of the casing to the internal volume of the casing 11, the greater the tendency with which heat enters and leaves the casing 11 and the shorter the time required for cold storage and cooling. The casing 11 is partitioned into a plurality of spaces 15. The casing 11 may be partitioned into, for example, two or more spaces 15, three or more spaces 15, four or more spaces 15, five or more spaces 15, six or more spaces 15, seven or more spaces 15, eight or more spaces 15, nine or more spaces 15, ten or more spaces 15, twenty or more spaces 15, or fifty or more spaces 15. The casing 11 may be partitioned into 1,000,000 spaces 15 or less. The plurality of spaces 15 may have the same shape, or may have different shapes. The casing 11 may include a region in which the plurality of spaces 15 are disposed so as to have the same shape and a region in which the plurality of spaces 15 are disposed so as to have different shapes. The plurality of spaces 15 each have a volume of, for example, 100 cm$^3$ or less. The plurality of spaces 15 may each have a volume that is, for example, 100 cm$^3$ or less, 90 cm$^3$ or less, 80 cm$^3$ or less, 70 cm$^3$ or less, 60 cm$^3$ or less, 50 cm$^3$ or less, 40 cm$^3$ or less, 30 cm$^3$ or less, 20 cm$^3$ or less, 10 cm$^3$ or less, 5 cm$^3$ or less, 4 cm$^3$ or less, 3 cm$^3$ or less, 2 cm$^3$ or less, or 1 cm$^3$ or less. The smaller the volume of each space 15, the larger the number of spaces 15 in the casing 11. The movable components in the corresponding spaces 15 cause crystal nuclei to be generated in the corresponding spaces. Therefore, the smaller the volumes of the spaces 15, the greater the tendency with which multiple crystal nuclei are generated at the same time in the plurality of spaces 15, and the more easily the crystallization of the entire heat storage material in the casing of the heat storage apparatus is completed in a short time.

It is desirable that the material of the casing 11 be a metal having good thermal conductivity, such as aluminum, copper, and stainless steel. The material of the casing 11 may be resin having good corrosion resistance, such as fluororesin, polyphenylenesulfide (PPS) resin, and polypropylene (PP) resin. The casing 11 may be made of a flexible material, such as a multilayer film including an aluminum foil and a resin film stacked upon each other.

For example, when the heat storage material 16 is used for cooling the interior of an automobile when an engine thereof is turned off while the automobile is stopped, it is necessary to repeat in a short time a cycle including heat storage in the heat storage material 16 and heat dissipation from the heat storage material 16. However, in many cases, the thermal conductivity of the heat storage material 16 is low. Therefore, it is desirable that the shape and the dimensions of the casing 11 be set such that the heat dissipated from the heat storage material 16 is quickly dissipated to the outside of the casing 11. For example, when the heat storage material 16 is in a solid state, the thickness of the heat storage material 16 is desirably 5 mm or less, more desirably, 3 mm or less, and most desirably, 2 mm or less. For example, the dimension of the casing 11 in a specified direction (such as a Y-axis direction) is set to correspond to a desirable thickness value of the heat storage material 16. A plurality of thin heat storage materials 16 having desired thicknesses may be provided by disposing fins for heat transfer enhancement in the casing 11.

As illustrated in FIGS. 1B, 2B, 3B, and 4B, the casing 11 includes a pair of inner peripheral surfaces that are disposed side by side in a specified direction (such as the Y-axis direction) and face opposite directions. When the distance between the pair of inner peripheral surfaces is D, and the dimension of each movable component 13 in the specified direction is L, for example, D/L is 1.02 to 2.70. In this case, since the distance between the location where the aforementioned movement or movements occur and each inner peripheral surface of the casing 11 is small, heat that is generated by cancelling supercooling of the heat storage material 16 is quickly dissipated to the outside of the casing 11.

For example, it is possible to cause the aforementioned movement or movements to occur by changing the position of the casing 11 and the position of each movable component 13 relative to each other as time proceeds as a result of applying vibration energy to the casing 11 or each movable component 13. The vibration energy may be vibration energy that is generated by a vibration generator for exclusively vibrating the casing 11 or each movable component 13, or may be vibration energy, which is made use of, from a vibration generation source of a system or an apparatus including any one of the heat storage apparatuses 10a to 10d. For example, when any one of the heat storage apparatuses 10a to 10d is installed in an automobile, vibration energy that is generated from an internal combustion engine of the automobile is made use of as vibration energy that is applied to the casing 11 or to each movable component 13.

For example, when vibration energy having a frequency of 50 Hz and a predetermined amplitude is applied to the casing 11 in a specified direction of the casing 11 (such as the Y-axis direction), inertial force that is equivalent to the product of the vibration acceleration and the weight of each movable component 13 acts upon each movable component 13, and each movable component 13 moves in the casing 11, so that the position of the casing 11 and the position of each movable component 13 relative to each other change as time proceeds. Therefore, the aforementioned movement or movements occur while the heat storage material 16 circulates by convection. For example, one movable component 13 is disposed in a specified space that is occupied by the heat storage material 16 that is in contact with the inner peripheral surfaces of the casing 11, the movable component 13 collides with the inner peripheral surfaces of the casing 11 at least 50 times in one second. When the vibration amplitude is large, the movable component 13 may collide with the inner peripheral surfaces of the casing 11 about 100 times in one second. This causes the inner peripheral surfaces of the casing 11 and the movable component 13 to repeatedly contact with and separate from each other. When a plurality of movable components 13 are disposed in the specified space that is occupied by the heat storage material 16 that is in contact with the inner peripheral surfaces of the casing 11, the movable components 13 collide with each other in addition to colliding with the inner peripheral surfaces of the casing 11. Therefore, the movable components 13 repeatedly contact with and separate from each other.

Although the frequency of the vibration energy is not particularly limited to a certain frequency, the frequency of the vibration energy is, for example, 1 Hz to 200 Hz. This tends to cancel the supercooling of the heat storage material 16.

In order to cause the aforementioned movement or movements to occur, methods other than the method that uses vibration energy may be used. For example, the aforementioned movement or movements may be caused to occur by changing the position of the casing 11 and the position of each movable component 13 including a magnetic body relative to each other as time proceeds as a result of generating a magnetic field around each movable component 13. In this case, for example, a publicly known magnetic stirrer may be used, and the aforementioned movement or movements may be caused to occur by sliding between each movable component 13 and the inner peripheral surfaces of the casing 13.

It is possible to cause the aforementioned movement or movements to occur by changing the position of the casing 11 and the position of each movable component 13 relative to each other as time proceeds as a result of applying an external force to the casing 11 and deforming the casing 11. For example, it is possible to cause the aforementioned movement or movements to occur by rolling a roller along an outer peripheral surface of the casing 11 while pressing the roller against the outer peripheral surface of the casing 11 and applying a predetermined force to the roller. In this case, for example, the roller is caused to reciprocate along the outer peripheral surface of the casing 11. For example, such a method can be performed by using the heat storage apparatus 10d shown in FIGS. 4A and 4B. For example, the roller is caused to reciprocate in a Z-axis direction or an X-axis direction while pressing the roller against the outer peripheral surface of the casing 11 that is perpendicular to the Y axis in FIGS. 4A and 4B and applying a force that allows the inner peripheral surfaces of the casing 11 to contact the movable components 13 to the roller. That is, the casing 11 is deformed due to an external force in the Y-axis direction, and, thus, the position of the casing 11 and the position of each movable component 13 relative to each other change as time proceeds.

It is possible to cause the aforementioned movement or movements to occur by changing the position of the casing 11 and the position of each movable component 13 relative to each other as time proceeds as a result of applying an external force to the casing 11 and directly or indirectly displacing the casing 11.

Although the shape of each movable component 13 is not particularly limited to a certain shape, it is desirable that the shape of each movable component 13 be one that allows the viscosity resistance that the movable components 13 are subjected to when the movable components 13 move in the heat storage material 16 to be small, such as a spherical shape, a needle shape, a scale shape, a wedge shape, and a rectangular parallelepiped shape. The shape of each movable component 13 may be the shape of a rectangular thin plate, a shape that is formed by bending the rectangular thin plate, or a shape that is formed by connecting a plurality of rectangular thin plates. In order to cause the aforementioned movement or movements to occur, each movable component 13 may contact another movable component 13 or another type of member, for example, at a point, along a line, or along a plane.

The material of each movable component 13 is not particularly limited to a certain material, and may be any one of the examples of the material of the casing 11. It is desirable that each movable component 13 be made of a material having good thermal conductivity. However, each movable component 13 may be made of glass, ceramic, resin, or rubber. When each movable component 13 is made of a material that differs from the material of the casing 11, it is desirable that the combination of the material of each movable component 13 and the material of the casing 11 be a combination that is resistant to corrosion. In order for the heat storage material 16 to store cold heat in a short time, it is necessary to quickly dissipate to the outside of the casing, heat that is generated when the heat storage material 16 is crystallized. Therefore, it is desirable to choose the shape and the material of each movable component 13 by considering thermal conductivity.

In many cases, crystallization heat is dissipated when the heat storage material is being crystallized. The reaction in which locally generated tiny crystals gradually develop is a successive reaction that progresses while crystallization heat that is generated at a solid-liquid interface is dissipated. Therefore, in the method in which crystals locally generated in the heat storage material are gradually developed, it takes a long time for crystallization heat of the entire heat storage material to be dissipated and the crystallization of the heat storage material to be completed. If multiple crystal nuclei can be generated in a short time in the entire heat storage material, exothermic reaction resulting from the crystallization of the heat storage material occurs at about the same time in the entire heat storage material. In this case, if the heat that is generated by the crystallization of the heat storage material can be dissipated in a short time from the entire heat storage material, the heat storage material can be crystallized in a short time.

By contact and separation between the movable components or sliding between the movable components, or contact and separation between each movable component and another type of member or sliding between each movable component and another type of member, crystal nuclei are generated to cancel the supercooling of the heat storage material. By continuing the contact and separation between the movable components or the sliding between the movable components, or contact and separation between each movable component and another type of member or the sliding between each movable component and another type of member, the heat storage material circulates by convection. As a result, the generated crystal nuclei move in the heat storage material. When the crystallization of the heat storage material is started, the viscosity of the heat storage material increases, each movable component stops moving, and the crystal nuclei no longer circulate by convection. When the crystal nuclei have not diffused over the entire heat storage material, the crystallization of the heat storage material progresses successively. Therefore, it takes a long time for the heat storage material to be crystallized. In order to quickly complete the crystallization of the cold storage material by cancelling the supercooling of the heat storage material, it is necessary to diffuse the crystal nuclei over the entire heat storage material in a short time by circulating by convection the crystal nuclei generated by the contact and separation between the movable components or the sliding between the movable components, or the contact and separation between each movable component and another type of member or the sliding between each movable component and another type of member.

When each movable component 13 has, in particular, a shape that allows the viscosity resistance that each movable component 13 is subjected to when each movable component 13 moves in the heat storage material 16 to be small, such as a spherical shape, a needle shape, a scale shape, a wedge shape, or a rectangular parallelepiped shape, the range in which the crystal nuclei can be diffused by being circulated by convection before the viscosity of the heat storage material 16 is increased is limited. Therefore, in the spaces of 100 $cm^3$ occupied by the heat storage material 16 contained in the casing 11, the movable components 13 are disposed at locations where the aforementioned movement or movements can occur. Desirably, in the spaces of 10 $cm^3$ occupied by the heat storage material 16 contained in the casing 11, the movable components 13 are disposed at locations where the aforementioned movement or movements can occur. Desirably, in the spaces of 1 $cm^3$ occupied by the heat storage material 16 contained in the casing 11, the movable components 13 are disposed at locations where the aforementioned movement or movements can occur. From the viewpoint of reducing manufacturing costs of the heat storage apparatus 10a to 10d, when, in the spaces having a predetermined volume and occupied by the heat storage material 16 contained in the casing 11, the movable components 13 are disposed at locations where the aforementioned movement or movements can occur, the predetermined volume is, for example, 0.008 $cm^3$ or greater.

Figure 2A:
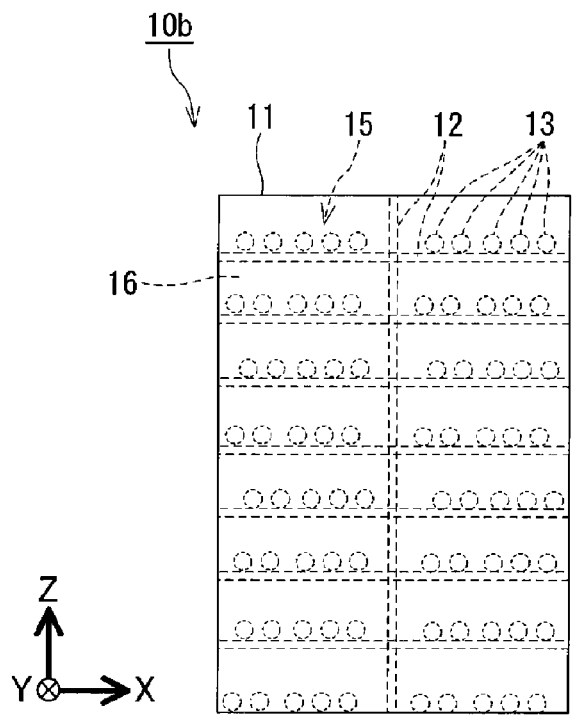
FIG. 2A is a front view of another exemplary heat storage apparatus according to the present disclosure.
Figure 2B:
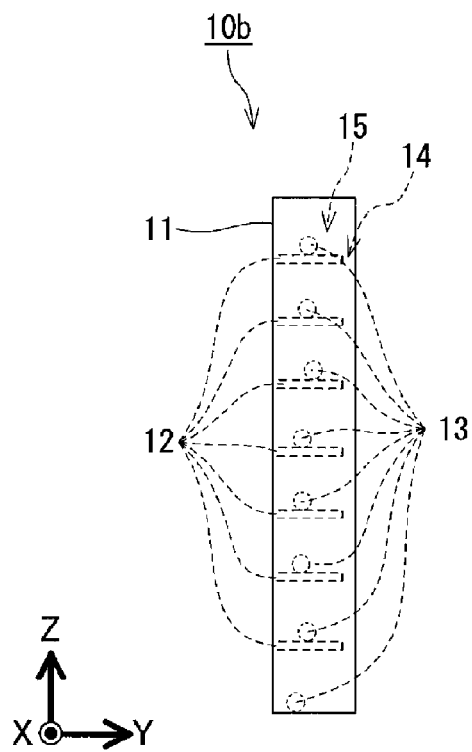
FIG. 2B is a side view of the heat storage apparatus in FIG. 2A.

As shown in FIGS. 2A and 2B, a plurality of movable components 13 may be disposed in each specified space 15 occupied by the heat storage material 16 contained in the casing 11. In this case, the movable components 13 may collide with each other or slide with respect to each other. This makes it possible to increase the number of crystal nuclei that are generated and to complete the crystallization of the heat storage material 16 in a short time.

Figure 3A:
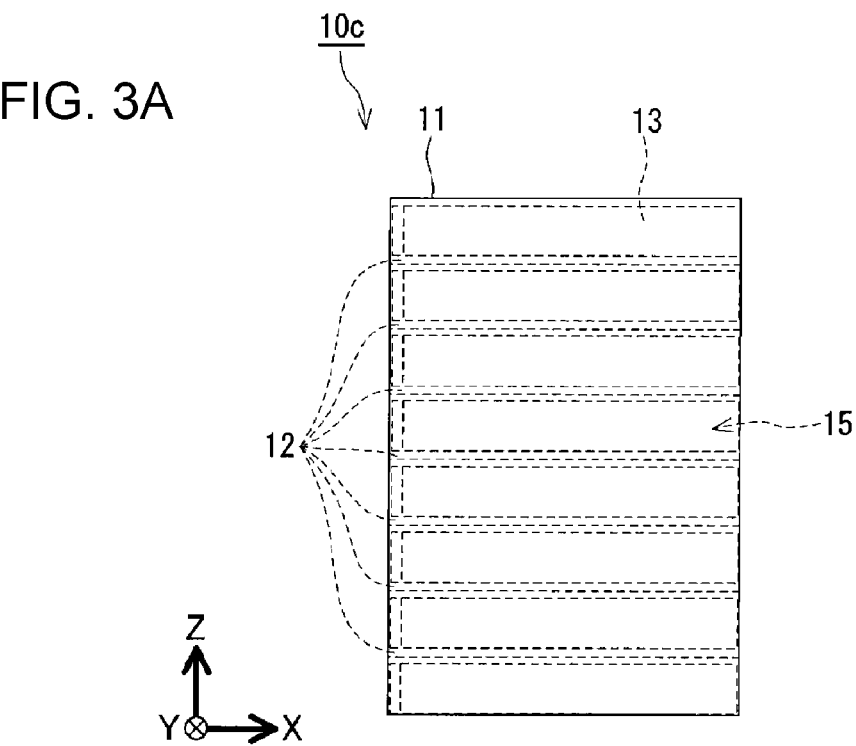
FIG. 3A is a front view of still another exemplary heat storage apparatus according to the present disclosure.
Figure 3B:
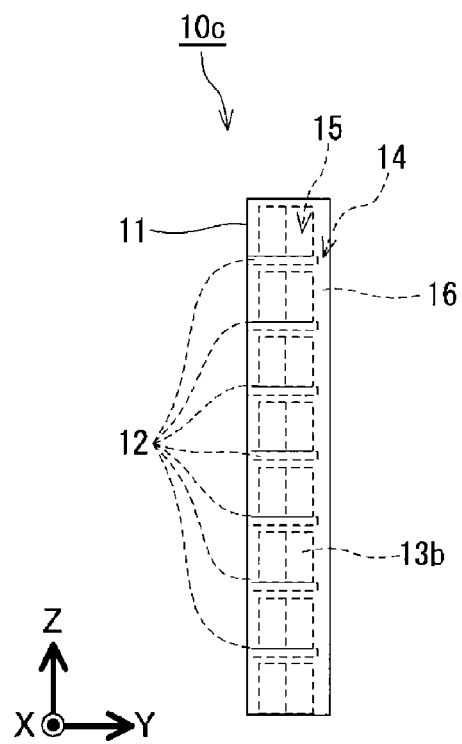
FIG. 3B is a side view of the heat storage apparatus in FIG. 3A.
Figure 3C:
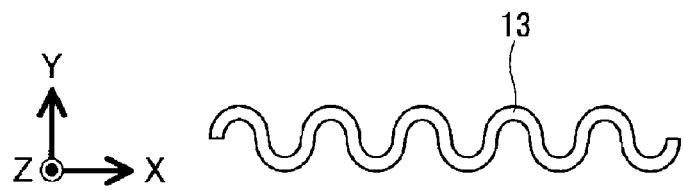
FIG. 3C is a plan view of a movable component in FIG. 3A.
Figure 3D:
FIG. 3D is a front view of the movable component in FIG. 3A.
Figure 3E:
FIG. 3E is a side view of the movable component in FIG. 3A.

As shown in FIGS. 3C, 3D, and 3E, each movable component 13 may be made of a corrugated sheet.

Figure 4A:
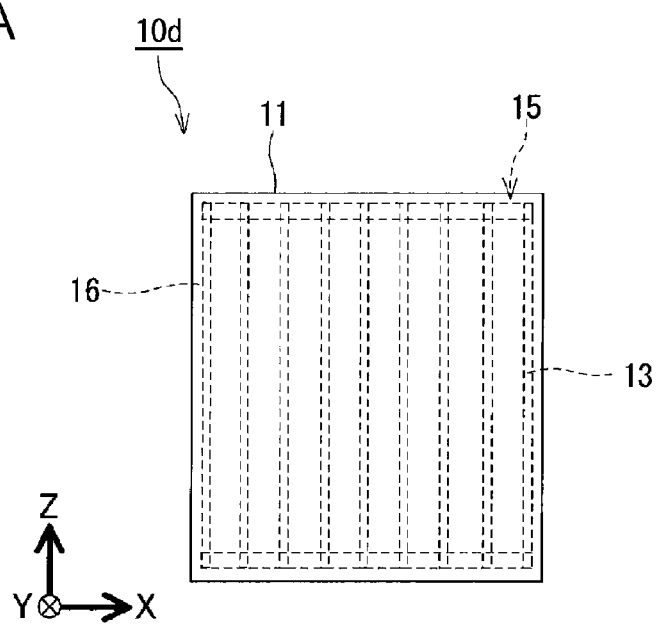
FIG. 4A is a front view of still another exemplary heat storage apparatus according to the present disclosure.
Figure 4B:
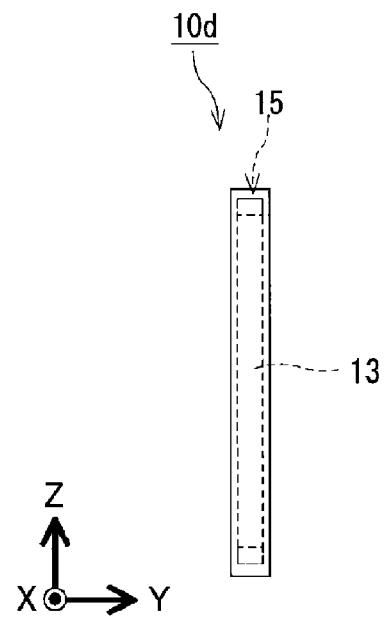
FIG. 4B is a side view of the heat storage apparatus in FIG. 4A.

As shown in FIGS. 4A and 4B, the movable components 13 may have a configuration formed by connecting a plurality of rectangular thin plates. The movable components 13 have, for example, a configuration in which principal surfaces of the rectangular thin plates face each other and the rectangular thin plates are disposed side by side in a specified direction (the X-axis direction). In this case, since the number of and areas of portions that contact the inner peripheral surfaces of the casing 11 is large, the efficiency with which crystal nuclei are generated is high. The movable components 13 have, for example, a configuration in which principal surfaces of rectangular thin plates face each other and the rectangular thin plates are disposed side by side in a specified direction. In this case, the volume of each space defined by two adjacent rectangular thin plates is, desirably, 10 $cm^3$ or less; more desirably, 5 $cm^3$ or less; and even more desirably 1 $cm^3$ or less.

The movable components 13 may have a configuration formed by combining a plurality of rectangular thin plates in a lattice arrangement. In this case, the volume of one space in the lattice arrangement of the movable components 13 is desirably 10 $cm^3$ or less; more desirably, 5 $cm^3$ or less; and even more desirably 1 $cm^3$ or less.

In order to adjust the pressure or frictional force that is generated when contact between the movable components 13 or between each movable component 13 and another type of member in the aforementioned movements is performed, the surface roughness of each movable component 13 or the surface roughness of the inner peripheral surfaces of the casing 11 may be adjusted. The surface of each movable component 13 or each inner peripheral surface of the casing 11 may have an uneven shape. When the size of each movable component 13 is increased and contact area when the movable components 13 contact each other or each movable component 13 contacts another type of member is increased, a high surface roughness of the surface of each movable component 13 and a high surface roughness of each inner peripheral surface of the casing 11 are advantageous in cancelling supercooling of the heat storage material 16. As a method of increasing the surface roughness of each movable component 13 and the surface roughness of each inner peripheral surface of the casing 11, a sand blasting method or a wet etching method may be used. In the sand blasting method, the surface of a member whose surface roughness is to be increased is physically made rough by blowing tiny ceramic particles against the surface of the member. In the wet etching method, the surface of a member whose surface roughness is to be increased is made rough by immersing the member in a predetermined chemical liquid and chemically corroding the surface of the member.

The distance between each movable component 13 and each inner peripheral surface of the casing 11 is not particularly limited to a certain distance. When the aforementioned movement or movements are caused to occur by applying vibration energy to the casing 11 or the movable components 13, from the viewpoint of reducing energy that is consumed to generate the vibration energy, the vibration amplitude is, for example, 1 to 2 mm. Therefore, when the movable components 13 are small, that is, when the viscosity resistance that the movable components 13 are subjected to when the movable components 13 move in the heat storage material 16 is small, the maximum value of the distance between each movable component 13 and each inner peripheral surface of the casing 11 in a vibration direction is, desirably, 1 to 2 mm. In contrast, when the movable components 13 are large, that is, when the viscosity resistance that the movable components 13 are subjected to when the movable components 13 move in the heat storage material 16 is large, the maximum value of the distance between each movable component 13 and each inner peripheral surface of the casing 11 in the vibration direction is, desirably, 1 mm or less. When the movable components 13 are large, as the viscosity resistance that the movable components 13 are subjected to when the movable components 13 move in the heat storage material 16 increases, it may become difficult to cancel the supercooling of the heat storage medium 16 by contact and separation between each movable component 16 and the inner peripheral surfaces of the casing 11 as a result of collision between them. In this case, the supercooling of the heat storage material 16 is advantageously cancelled by sliding between each movable component 13 and the inner peripheral surfaces of the casing 11. In this case, the maximum value of the distance between each inner peripheral surface of the casing 11 and each movable component 13 in a direction perpendicular to a plane in which the movable components 13 slide with respect to the inner peripheral surfaces of the casing 11 is, for example, 0.1 to 0.5 mm.

As shown in, for example, FIGS. 1A, 2A, and 3A, the heat storage apparatuses 10a to 10c include partitioning members 12 as structural members. Each partitioning member 12 has a structure that allows passage of the heat storage material 16 in a liquid phase, and partitions the internal space in the casing 11 into the plurality of spaces 15. As shown in, for example, FIGS. 1B, 2B, and 3B, each partitioning member 12 forms a predetermined gap 14 between it and the inner peripheral surfaces of the casing 11. This allows portions of the heat storage material 16 to circulate by convection more easily through the gaps 14. Each partitioning member 12 may have, for example, a plurality of holes to allow portions of the heat storage material in the liquid phase to pass through the partitioning members 12. Alternatively, each partitioning member 12 may be formed from nets. In this case, portions of the heat storage material 16 in the liquid phase are capable of passing through each partitioning member 12.

As shown in FIGS. 1A, 2A, and 3A, for example, at least one movable component 13 may be disposed in each of the spaces 15 formed by the partitioning members 12. This makes it possible to more reliably complete the crystallization of the heat storage material 16 in a short time.

As shown in FIG. 4A, the partitioning members 12 may also be movable components 13. That is, the internal space in the casing 11 may be partitioned into the plurality of spaces 15 by the movable components 13. This makes it possible to partition the internal space in the casing 11 into the plurality of spaces 15 and to increase the volume of the heat storage material 16 that can be contained in the casing 11.

When the heat storage material 16 is in a supercooled state, as the difference obtained by subtracting the temperature of the heat storage material 16 in supercooled from the melting point of the heat storage material 16 (supercooling degree) is increased, the tendency with which the supercooling of the heat storage material 16 is cancelled is increased, and the speed with which the heat storage material 16 is crystallized is high. However, when the heat storage material 16 is used for cooling purposes, in order to increase the supercooling degree of the heat storage material, the amount of energy that is consumed by an apparatus for applying cold heat to the heat storage material 16, such as a compressor, in a refrigeration cycle becomes large. Therefore, the supercooling degree of the heat storage material 16 in each of the heat storage apparatuses 10a to 10d is, for example, 10 K or less; desirably, 8 K or less; and more desirably, 7 K or less. This makes it possible to reduce the amount of energy that is consumed when storing cold heat in the heat storage material 16.

Although the heat storage material 16 is not particularly limited to a certain material, the heat storage material 16 is, for example, a mixture of TBAB and water, a mixture of THF and water, a different mixture that contains water and that can form a clathrate hydrate, or a hydrated salt that can form a hydrate other than a clathrate hydrate. The term "clathrate hydrate" is a general term used to refer to a clathrate compound in which various guest molecules are trapped in a molecular-scale cage structure, formed by water molecules, by hydrophobic interaction. The term "guest molecules" refers to molecules that are trapped in the "cage structure", formed by the water molecules, and are stabilized. The heat storage material 16 has a melting point that is in, for example, a temperature range suitable for cooling, a temperature range suitable for heating, or a temperature range suitable for refrigerating. It is desirable that the heat storage material 16 be one that can be easily acquired at a low cost. The heat storage material 16 may be a single type of heat storage material or may contain two or more types of heat storage materials. The heat storage material 16 may contain various types of additives. Examples of additives contained in the heat storage material 16 include an anticorrosive agent, a viscosity adjusting agent, a foam stabilizer, an antioxidant, a defoaming agent, an abrasive grain, a filler, a pigment, a dye, a coloring agent, a thickener, a surfactant, a flame retardant, a plasticizer, a lubricant, an antistatic agent, a heat-resistance stabilizer, a tackifier, a curing agent, a stabilizer, a silane coupling agent, and wax. The heat storage stabilizer 16 may contain any one type of these additives singly or may contain a combination of two or more types of these additives. In the method of completing the crystallization of the heat storage material according to the present disclosure, the type (or types) of additive (or the additives) and the quantity (or the quantities) of the additive (or the additives) contained in the heat storage material 16 are not particularly limited to certain types and quantities.

When the heat storage material 16 is a material that can form clathrate hydrate, it is possible to prepare the heat storage material 16, for example, as follows. First, a guest substance for forming a clathrate hydrate is gradually added to a predetermined amount to pure water or ion-exchange water in a casing while stirring the pure water or the ion-exchange water; and the pure water or the ion-exchange water and the guest substance are sufficiently mixed. If necessary, at the same time that the guest substance is added, before the guest substance is added, or subsequently to adding the guest substance, any of the aforementioned additives may be added to the pure water or the ion-exchange water and mixed and/or stirred. In this way, the heat storage material 16 can be prepared. The heat storage material 16 may also be prepared by performing a method in which the pure water or the ion-exchange water is supplied to the casing in which the guest substance and any of the aforementioned additives have been previously mixed. The order in which the guest substance and the additive or additives are added is not particularly limited to a certain order. In order to accelerate the dissolution or diffusion of the guest substance or the additive or additives, the guest substance or the additive or additives may be heated to prepare the heat storage material 16. In this case, the heating is performed such that the guest substance or the additive or additives are not chemically decomposed.

EXAMPLES

The method of completing the crystallization of the heat storage material and the heat storage apparatus according to the present disclosure are described in more detail by way of examples. However, the method of completing the crystallization of the heat storage material and the heat storage apparatus according to the present disclosure are not limited to these examples.

Example 1

A heat storage apparatus according to Example 1, such as that shown in FIG. 1A, was prepared. A casing 11 of the heat storage apparatus according to Example 1 had a rectangular parallelepiped shape, and the casing 11 having a rectangular parallelepiped shape was made of stainless steel except that one surface of the casing 11 was made of a transparent glass plate. An internal space in the casing 11 was partitioned by partitioning members 12, made of stainless steel, into a plurality of spaces 15 having a dimension of 2.7 mm in the Z-axis direction and a dimension of 3.0 mm in the X-axis direction and the Y-axis direction. That is, the volume of each space 15 was 24.3 mm$^3$ (0.0243 cm$^3$). The internal space in the casing 11 had a volume of 0.91719 cm$^3$. The difference obtained by subtracting the volume occupied by the partitioning members 12 from the volume of the internal space (0.91719 cm$^3$) in the casing 11 was 0.810171 cm$^3$. One movable component 13 was disposed in each space 15 of the heat storage apparatus according to Example 1. Each movable component 13 of the heat storage apparatus according to Example 1 was a ball made of stainless steel and having a diameter of 1.5 mm. The distance between a ceiling surface defining each space 15 and a corresponding one of the movable components 13 was 1.2 mm. The internal space in the casing 11 was filled with a 40 wt % aqueous solution of TBAB serving as a heat storage material 16. The plurality of spaces 15 communicated with each other through gaps 14 having sizes not allowing the movable components 13 in the corresponding spaces to move into a different space 15. The melting point of the 40 wt % aqueous solution of TBAB was 12° C.

The heat storage apparatus according to Example 1 was fixed to a vibration tester by using a jig allowing water-cooling of the vicinity of the casing 11 to a predetermined temperature. By using this jig, the vicinity of the casing 11 was water-cooled to set the temperature of the heat storage material 16 to 5° C. At this time, the heat storage material 16 was kept in a liquid phase, and was in a supercooled state in which the supercooling degree was 7 K. Next, the vibration tester was operated to vibrate the casing 11 in the Z-axis direction for 55 seconds with a frequency of 50 Hz, an amplitude of 1.8 mm, and an acceleration of 80 m/s$^2$. The progress of the crystallization of the heat storage material 16 was visually checked at 60 seconds from when the vibration was started by using the vibration tester. As a result of the checking, it was confirmed that the crystallization of the heat storage material 16 was completed at 60 seconds. That is, the heat storage material 16 was crystallized in the entire internal space in the casing 11.

Example 2

A heat storage apparatus according to Example 2, such as that shown in FIG. 2A, was prepared. A casing 11 of the heat storage apparatus according to Example 2 had a rectangular parallelepiped shape, and the casing 11 having a rectangular parallelepiped shape was made of stainless steel except that one surface of the casing 11 was made of a transparent glass plate. An internal space in the casing 11 was partitioned by partitioning members 12 made of stainless steel into a plurality of spaces 15 having a dimension of 2.7 mm in the Z-axis direction, a dimension of 3.0 mm in the Y-axis direction, and a dimension of 10.0 mm in the X-axis direction. That is, the volume of each space 15 was 81.0 mm$^3$ (0.081 cm$^3$). The internal space in the casing 11 had a volume of 1.443 cm$^3$. The difference obtained by subtracting the volume occupied by the partitioning members 12 from the volume of the internal space (1.443 cm$^3$) in the casing 11 was 1.330 cm$^3$. Five movable component 13 were disposed in each space 15 of the heat storage apparatus according to Example 2. Each movable component 13 of the heat storage apparatus according to Example 2 was a ball made of stainless steel and having a diameter of 1.5 mm. The distance between a ceiling surface defining each space 15 and corresponding ones of the movable components 13 was 1.2 mm. The internal space in the casing 11 was filled with a 40 wt % aqueous solution of TBAB serving as a heat storage material 16. The plurality of spaces 15 communicated with each other through gaps 14 having sizes not allowing the movable components 13 in the corresponding spaces 15 to move into a different space 15.

The heat storage apparatus according to Example 2 was fixed to a vibration tester by using a jig allowing water-cooling of the vicinity of the casing 11 to a predetermined temperature. By using this jig, the vicinity of the casing 11 was water-cooled to set the temperature of the heat storage material 16 to 5° C. At this time, the heat storage material 16 was kept in a liquid phase, and was in a supercooled state in which the supercooling degree was 7 K. Next, the vibration tester was operated to vibrate the casing 11 in the Z-axis direction for 55 seconds with a frequency of 50 Hz, an amplitude of 1.8 mm, and an acceleration of 80 m/s$^2$. The progress of the crystallization of the heat storage material 16 was visually checked at 60 seconds from when the vibration was started by using the vibration tester. As a result of the checking, it was confirmed that the crystallization of the heat storage material 16 was completed at 60 seconds.

Example 3

A heat storage apparatus according to Example 3, such as that shown in FIG. 3A, was prepared. A casing 11 of the heat storage apparatus according to Example 3 had a rectangular parallelepiped shape, and the casing 11 having a rectangular parallelepiped shape was made of stainless steel except that one surface of the casing 11 was made of a transparent glass plate. An internal space in the casing 11 was partitioned by partitioning members 12 made of stainless steel into a plurality of spaces 15 having a dimension of 2.2 mm in the Z-axis direction, a dimension of 2.2 mm in the Y-axis direction, and a dimension of 21.0 mm in the X-axis direction. That is, the volume of each space 15 was 101.6 mm$^3$ (0.1016 cm$^3$). The internal space in the casing 11 had a volume of 0.9101 cm$^3$. The difference obtained by subtracting the volume occupied by partitioning members 12 from the volume of the internal space (0.9101 cm$^3$) in the casing 11 was 0.8461 cm$^3$. Inner peripheral surfaces, made of stainless steel, of the casing 11 was subjected to a roughening treatment by performing sand blast to form the inner peripheral surfaces into surfaces like pear skin surfaces without metallic gloss. One movable component 13 shown in FIGS. 3C to 3E, formed from a corrugated plate, and made of stainless steel was disposed in each space 15 of the heat storage apparatus according to Example 3. Each movable component 13 had a dimension of 2.0 mm in the Z-axis direction, a dimension of 2.0 mm in the Y-axis direction, and a dimension of 20.0 mm in the X-axis direction. The thickness of the corrugated plate forming each movable component 13 was 0.3 mm. Each movable component 13 had a shape in which five wave forms having a wavelength of 4 mm appeared repeatedly in plan view. The internal space in the casing 11 was filled with a 40 wt % aqueous solution of TBAB serving as a heat storage material 16. The plurality of spaces 15 communicated with each other through gaps 14 having sizes not allowing the movable components 13 in the corresponding spaces 15 to move into a different space 15.

The heat storage apparatus according to Example 3 was fixed to a vibration tester by using a jig allowing water-cooling of the vicinity of the casing 11 to a predetermined temperature. By using this jig, the vicinity of the casing 11 was water-cooled to set the temperature of the heat storage material 16 to 5° C. At this time, the heat storage material 16 was kept in a liquid phase, and was in a supercooled state in which the supercooling degree was 7 K. Next, the vibration tester was operated to vibrate the casing 11 in the Z-axis direction for 55 seconds with a frequency of 50 Hz, an amplitude of 1.8 mm, and an acceleration of 80 m/s². The progress of the crystallization of the heat storage material 16 was visually checked at 60 seconds from when the vibration was started by using the vibration tester. As a result of the checking, it was confirmed that the crystallization of the heat storage material 16 was completed at 60 seconds.

Example 4

A heat storage apparatus according to Example 4, such as that shown in FIGS. 4A and 4B, was prepared. A casing 11 of the heat storage apparatus according to Example 4 had a rectangular parallelepiped shape, and the casing 11 having a rectangular parallelepiped shape was a casing in which one of a pair of surfaces disposed side by side in the Y-axis direction of the casing 11 was formed of a transparent film and the other surface was formed of a multilayer film including an aluminum foil and a resin film stacked upon each other. The casing 11 had an internal space having a dimension of 31.0 mm in the Z-axis direction, a dimension of 2.2 mm in the Y-axis direction, and a dimension of 22.0 mm in the X-axis direction. That is, the internal space in the casing 11 had a volume of 1500.4 mm³ (1.5004 cm³). Inner peripheral surfaces, made of stainless steel, of the casing 11 was subjected to a roughening treatment by performing sand blast to form the inner peripheral surfaces into surfaces like pear skin surfaces without metallic gloss. Movable components 13 were disposed in the internal space of the heat storage apparatus according to Example 4. The movable components 13 included ten thin plates made of stainless steel and having a dimension of 30.0 mm in the Z-axis direction, a dimension of 2.0 mm in the Y-axis direction, and a dimension of 0.3 mm in the X-axis direction. In the movable components 13, the ten thin plates made of stainless steel were disposed side by side at an interval of 2 mm in the X-axis direction and two ends in the Z-axis direction of the ten thin plates made of stainless steel were connected. Two thin plates made of stainless steel of adjacent movable components 13 formed a space 15. The volume of each space 15 was 120 mm³ (0.12 cm³). The difference obtained by subtracting the volume occupied by the movable components 13 (30.0 mm×2.0 mm×0.3 mm×10 thin plates+volumes of connecting portions at two ends) from the volume of the internal space (1.5004 cm³) in the casing 11 was 1.2988 cm³. The internal space in the casing 11 was filled with a 40 wt % aqueous solution of TBAB serving as a heat storage material 16.

The heat storage apparatus according to Example 4 was fixed to a vibration tester by using a jig allowing water-cooling of the vicinity of the casing 11 to a predetermined temperature. By using this jig, the vicinity of the casing 11 was water-cooled to set the temperature of the heat storage material 16 to 5° C. At this time, the heat storage material 16 was kept in a liquid phase, and was in a supercooled state in which the supercooling degree was 7 K. Next, the vibration tester was operated to vibrate the casing 11 in the Y-axis direction for 55 seconds with a frequency of 50 Hz, an amplitude of 1.8 mm, and an acceleration of 80 m/s². The progress of the crystallization of the heat storage material 16 was visually checked at 60 seconds from when the vibration was started by using the vibration tester. As a result of the checking, it was confirmed that the crystallization of the heat storage material 16 was completed at 60 seconds.

Example 5

A heat storage apparatus according to Example 5, such as that shown in FIGS. 4A and 4B, was prepared. A casing 11 of the heat storage apparatus according to Example 5 had a rectangular parallelepiped shape. The casing 11 having a rectangular parallelepiped shape was a casing in which one of a pair of surfaces disposed side by side in the Y-axis direction of the casing 11 was formed of a transparent film and the other surface was formed of a multilayer film including an aluminum foil and a resin film stacked upon each other. The casing 11 had an internal space having in a dimension of 31.0 mm in the Z-axis direction, a dimension of 2.2 mm in the Y-axis direction, and a dimension of 68.0 mm in the X-axis direction. That is, the internal space in the casing 11 had a volume of 4,637.6 mm³ (4.6376 cm³). Inner peripheral surfaces, made of stainless steel, of the casing 11 was subjected to a roughening treatment by performing sand blast to form the inner peripheral surfaces into surfaces like pear skin surfaces without metallic gloss. Movable components 13 were disposed in the internal space of the heat storage apparatus according to Example 5. The movable components 13 included thirty thin plates made of stainless steel and having a dimension of 30.0 mm in the Z-axis direction, a dimension of 2.0 mm in the Y-axis direction, and a dimension of 0.3 mm in the X-axis direction. In the movable components 13, the thirty thin plates made of stainless steel were disposed side by side at an interval of 2 mm in the X-axis direction and two ends in the Z-axis direction of the thirty thin plates made of stainless steel were connected. Two thin plates made of stainless steel of adjacent movable components 13 formed a space 15. The volume of each space 15 was 120 mm³ (0.12 cm³). The difference obtained by subtracting the volume occupied by the movable components 13 (30.0 mm×2.0 mm×0.3 mm×30 thin plates+volumes of connecting portions at two ends) from the volume of the internal space (4.6376 cm³) in the casing 11 was 4.028 cm³. The internal space in the casing 11 was filled with a 40 wt % aqueous solution of TBAB serving as a heat storage material 16.

The heat storage apparatus according to Example 5 was immersed in a water tank in which water had accumulated, and the water temperature in the water tank was adjusted to cool the vicinity of the casing 11 such that the temperature of the heat storage material 16 was set to 5° C. At this time, the heat storage material 16 was kept in a liquid phase, and was in a supercooled state in which the supercooling degree was 7 K. Next, a roller having a length of 100 mm and used for lamination was reciprocated at a speed of 30 mm/s in the Z-axis direction along an entire outer peripheral surface of the casing 11, positioned opposite to the transparent film in the Y-axis direction, while pressing the outer peripheral surface of the casing 11. The pressure for pressing the outer peripheral surface of the casing 11 by the roller was adjusted to 1 to 10 N/mm². By elastically deforming the casing 11 by pressing the outer peripheral surface of the casing 11 by the roller and by reciprocating the roller, each movable component 13 and the inner peripheral surfaces of the casing 11 repeatedly contacted with and separated from each other. At 55 seconds from when the roller started pressing the outer peripheral surface of the casing 11, the roller was separated from the outer peripheral surface of the casing 11, and at 60 seconds from when the roller starting pressing the outer peripheral surface of the casing 11, the progress of crystallization of the heat storage material 16 was visually checked. As a result of the checking, it was confirmed that the crystallization of the heat storage material 16 was completed at 60 seconds.

Example 6

A heat storage apparatus according to Example 6 was prepared similarly to that in Example 5 except that a casing 11 and movable components 13 differed as follows. The casing 11 of the heat storage apparatus according to Example 6 had an internal space having a dimension of 151.0 mm in the Z-axis direction, a dimension of 2.2 mm in the Y-axis direction, and a dimension of 311.5 mm in the X-axis direction. That is, the internal space in the casing 11 had a volume of 103480.3 mm³ (103.4803 cm³). Movable components 13 included 125 thin plates made of stainless steel and having a dimension of 150.0 mm in the Z-axis direction, a dimension of 2.0 mm in the Y-axis direction, and a dimension of 0.5 mm in the X-axis direction. In the movable components 13, the 125 thin plates made of stainless steel were disposed side by side at an interval of 2 mm in the X-axis direction and two ends in the Z-axis direction of the 125 thin plates made of stainless steel were connected to each other. Two thin plates made of stainless steel of adjacent movable components 13 formed a space 15. The volume of each space 15 was 600 mm³ (0.6 cm³). The difference obtained by subtracting the volume occupied by the movable components 13 (150.0 mm×2.0 mm×0.5 mm×125 thin plates+volumes of connecting portions at two ends) from the volume of the internal space (103.4803 cm³) in the casing 11 was 84.2343 cm³. Regarding the heat storage apparatus according to Example 6, the progress of crystallization of a heat storage material 16 was visually checked similarly to that in Example 5. As a result of the checking, it was confirmed that the crystallization of the heat storage material 16 was completed at 60 seconds from when the pressing of the outer peripheral surface of the casing 11 by the roller was started.

Comparative Example

Figure 5A:
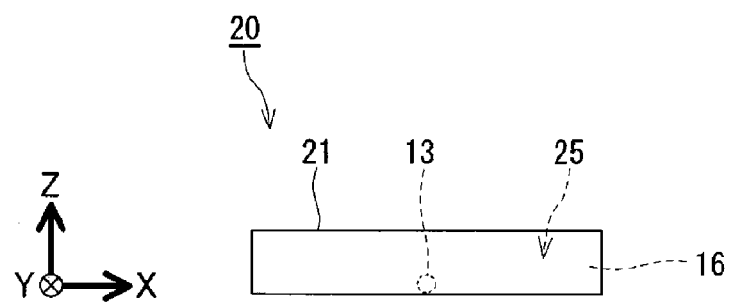
FIG. 5A is a front view of a heat storage apparatus according to a comparative example.
Figure 5B:
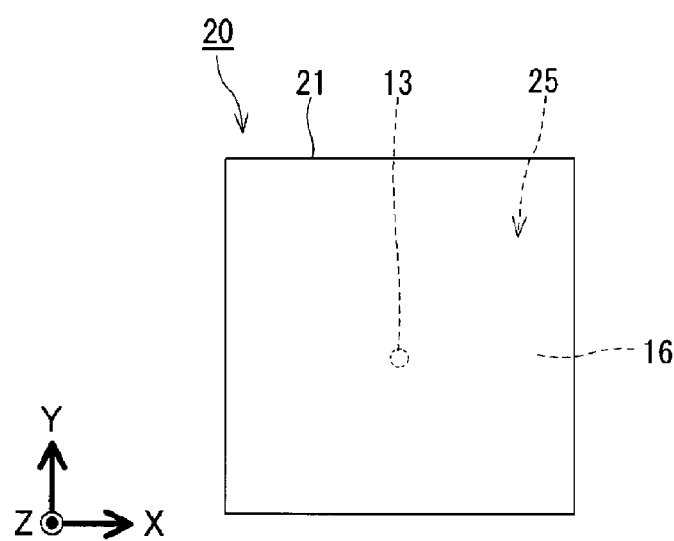
FIG. 5B is a plan view of the heat storage apparatus in FIG. 5A.

A heat storage apparatus 20 according to a comparative example, such as that shown in FIGS. 5A and 5B, was prepared. A casing 21 of the heat storage apparatus 20 according to the comparative example had a rectangular parallelepiped shape, and the casing 21 was made of stainless steel except that one surface of the casing 21 was made of a transparent glass plate. An internal space 25 in the casing 21 was formed as a single space having a dimension of 2.7 mm in the Z-axis direction, and a dimension of 19.5 mm in the X-axis direction and the Y-axis direction. The internal space 25 in the casing 21 had a volume of approximately 1027 mm³ (approximately 1.027 cm³). One movable component 13 was disposed in the internal space 25 of the heat storage apparatus according to the comparative example. The movable component 13 was a ball made of stainless steel and having a diameter of 1.5 mm. The distance between a ceiling surface defining the internal space 25 and the movable component 13 was 1.2 mm. The internal space in the casing 21 was filled with a 40 wt % aqueous solution of TBAB serving as a heat storage material 16. The melting point of the 40 wt % aqueous solution of TBAB was 12° C.

The heat storage apparatus 20 according to the comparative example was fixed to a vibration tester by using a jig allowing water-cooling of the vicinity of the casing 21 to a predetermined temperature. By using this jig, the vicinity of the casing 21 was water-cooled to set the temperature of the heat storage material 16 to 5° C. At this time, the heat storage material 16 was kept in a liquid phase, and was in a supercooled state in which the supercooling degree was 7 K. Next, the vibration tester was operated to vibrate the casing 21 in the Z-axis direction for 55 seconds with a frequency of 50 Hz, an amplitude of 1.8 mm, and an acceleration of 80 m/s². The progress of crystallization of the heat storage material 16 was visually checked at 60 seconds from when the vibration was started by using the vibration tester. As a result of the checking, it was confirmed that the crystallization of the heat storage material 16 was not completed at 60 seconds. The time to the completion of the crystallization was subsequently measured, and was confirmed to be 600 seconds.

As indicated in Examples 1 to 6, the smaller the volume of the plurality of spaces 15 is, the easier it is to complete the crystallization of the entire heat storage material in a short time. This is because the smaller the volume of the plurality of spaces 15 is, the easier it is to, in each of the plurality of spaces 15, generate multiple crystal nuclei at the same time and further diffuse them. In particular, the heat storage apparatuses according to Examples 1 to 6 are capable of completing the crystallization of the heat storage material 16 in the supercooled state within one minute. Therefore, the heat storage apparatuses according to Examples 1 to 6 provide particularly desirable performances for cooling the interior of an automobile when the engine is turned off while the automobile is stopped.

The heat storage apparatus and method of the present disclosure are widely used in a system that can quickly store, as latent heat, cold heat required for cooling and can take out the cold heat at a predetermined temperature near the melting point of the heat storage material. The heat storage apparatus and method of the present disclosure can be widely applied to latent heat storage materials used at low temperatures, latent heat storage materials used for freezing and refrigerating, and latent heat storage materials used at high temperatures.

What is claimed is:

1. A heat storage apparatus, comprising:
 a casing having an internal space partitioned into a plurality of spaces;
 a heat storage material that is located in each of the plurality of spaces; and
 at least one movable component that is disposed in contact with the heat storage material in each of the plurality of spaces, and that is capable of changing a position thereof relative to a position of the casing as time proceeds,
 wherein each of the plurality of spaces has a volume of 10 cm³ or less.

2. The heat storage apparatus according to claim 1, wherein the casing includes a pair of inner peripheral surfaces that are disposed side by side in a specified direction and face opposite directions, and
wherein D/L is 1.02 to 2.70, where D is a distance between the pair of inner peripheral surfaces, and L is a dimension of the at least one movable component in the specified direction.

3. The heat storage apparatus according to claim 1, further comprising:
a partitioning member which serves as a structural member, which has a structure that allows passage of the heat storage material in a liquid phase, and which partitions the internal space in the casing into the plurality of spaces.

4. The heat storage apparatus according to claim 3, wherein the partitioning member serves as the at least one movable component.

5. The heat storage apparatus according to claim 1, wherein the number of the plurality of spaces is at least 10.

6. The heat storage apparatus according to claim 1, wherein each of the plurality of spaces has a volume of 1 cm$^3$ or less.

7. A method of completing crystallization of a heat storage material of a heat storage apparatus,
the heat storage apparatus comprising:
a casing having an internal space partitioned into a plurality of spaces, the casing including an inner peripheral surface;
the heat storage material that is located in each of the plurality of spaces; and
at least one movable component that is disposed in contact with the heat storage material in each of the plurality of spaces, and that is capable of changing a position thereof relative to a position of the casing as time proceeds,
wherein each of the plurality of spaces has a volume of 10 cm$^3$ or less,
the method comprising:
continuing at least one of movements of
(i) repeated contact and separation between the movable components or sliding between the movable components,
(ii) repeated contact and separation between the inner peripheral surface of the casing and the at least one movable component, or sliding between the inner peripheral surface of the casing and the at least one movable component, and
(iii) repeated contact and separation between a surface of a structural member in the casing and the at least one movable component, or sliding between the surface of the structural member in the casing and the at least one movable component,
to cancel supercooling of the heat storage material and complete the crystallization of the heat storage material in a predetermined time.

8. The method according to claim 7, wherein the casing includes a pair of the inner peripheral surfaces that are disposed side by side in a specified direction and face opposite directions, and
wherein D/L is 1.02 to 2.70, where D is a distance between the pair of inner peripheral surfaces, and L is a dimension of the at least one movable component in the specified direction.

9. The method according to claim 7, wherein the at least one of the movements is caused to occur by changing the position of the casing and the position of the at least one movable component relative to each other as time proceeds as a result of applying vibration energy to the casing or the at least one movable component.

10. The method according to claim 7, wherein the at least one movable component includes a magnetic body, and
wherein the at least one of the movements is caused to occur by changing the position of the casing and the position of the at least one movable component relative to each other as time proceeds as a result of generating a magnetic field around the at least one movable component.

11. The method according to claim 7, wherein the at least one of the movements is caused to occur by changing the position of the casing and the position of the at least one movable component relative to each other as time proceeds as a result of applying an external force to and deforming the casing.

12. The method according to claim 7, wherein the at least one of the movements is caused to occur by changing the position of the casing and the position of the at least one movable component relative to each other as time proceeds as a result of applying an external force to the casing and directly or indirectly displacing the at least one movable component.

13. The method according to claim 7, wherein each of the plurality of spaces has a volume of 1 cm$^3$ or less.

14. A heat storage apparatus, comprising:
a casing having an internal space partitioned into a plurality of spaces which are arranged in plural columns and plural rows;
a heat storage material that is located in each of the plurality of spaces; and
at least one movable component that is disposed in contact with the heat storage material in each of the plurality of spaces, and that is capable of changing a position thereof relative to a position of the casing as time proceeds.

15. A heat storage apparatus, comprising:
a casing having an internal space partitioned into a plurality of spaces;
a heat storage material that is located in each of the plurality of spaces; and
at least one movable component that is disposed in contact with the heat storage material in each of the plurality of spaces, and that is capable of changing a position thereof relative to a position of the casing as time proceeds,
wherein each of the plurality of spaces and the at least one movable component in each of the plurality of spaces are configured so that multiple crystal nuclei can be generated at a same time in each of the plurality of spaces.

16. The heat storage apparatus according to claim 15, wherein each of the plurality of spaces has a volume of 100 cm$^3$ or less.

17. The heat storage apparatus according to claim 15, wherein each of the plurality of spaces has a volume of 10 cm$^3$ or less.

18. The heat storage apparatus according to claim 15, wherein each of the plurality of spaces has a volume of 1 cm$^3$ or less.

* * * * *